United States Patent
McDougal et al.

(10) Patent No.: US 8,634,673 B1
(45) Date of Patent: Jan. 21, 2014

(54) METHOD AND APPARATUS FOR AUTOMATICALLY TUNING A PARAMETER OF AN IMAGE ENHANCEMENT ALGORITHM BASED ON AN ATTRIBUTE OF AN ORIGINAL IMAGE

(75) Inventors: Jay McDougal, Corvallis, OR (US); Brian S. Watson, Dallas, OR (US); Pamela Voss, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 678 days.

(21) Appl. No.: 12/611,818

(22) Filed: Nov. 3, 2009

Related U.S. Application Data

(60) Provisional application No. 61/112,890, filed on Nov. 10, 2008.

(51) Int. Cl.
*G06K 9/40* (2006.01)

(52) U.S. Cl.
USPC .......................................... 382/274

(58) Field of Classification Search
USPC ................ 382/276, 274, 272; 348/231.3
See application file for complete search history.

(56) References Cited

U.S. PATENT DOCUMENTS

| | | | |
|---|---|---|---|
| 5,818,975 A * | 10/1998 | Goodwin et al. | 382/274 |
| 6,115,104 A * | 9/2000 | Nakatsuka | 355/40 |
| 7,006,668 B2 * | 2/2006 | Iguchi et al. | 382/108 |
| 7,072,523 B2 | 7/2006 | Bolle et al. | |
| 7,146,059 B1 * | 12/2006 | Durand et al. | 382/260 |
| 7,280,705 B1 * | 10/2007 | Frank et al. | 382/274 |
| 7,539,342 B2 * | 5/2009 | Tabata et al. | 382/167 |
| 7,738,727 B2 * | 6/2010 | Chang et al. | 382/274 |
| 7,756,408 B2 * | 7/2010 | Ito et al. | 396/123 |
| 7,830,566 B2 * | 11/2010 | Yamada et al. | 358/518 |
| 7,969,456 B2 | 6/2011 | Brown Elliott et al. | |
| 7,999,858 B2 * | 8/2011 | Nayar et al. | 348/222.1 |
| 2001/0007599 A1 * | 7/2001 | Iguchi et al. | 382/274 |
| 2002/0080247 A1 * | 6/2002 | Takahashi et al. | 348/229 |
| 2002/0135743 A1 * | 9/2002 | Gindele | 355/18 |
| 2003/0048362 A1 * | 3/2003 | Watanabe et al. | 348/222.1 |
| 2005/0100242 A1 * | 5/2005 | Trifonov et al. | 382/274 |
| 2005/0169533 A1 | 8/2005 | Paragyios | |
| 2005/0243347 A1 * | 11/2005 | Hayaishi | 358/1.9 |
| 2007/0032886 A1 * | 2/2007 | Tsai | 700/17 |
| 2007/0206939 A1 * | 9/2007 | Ito et al. | 396/123 |
| 2007/0223814 A1 * | 9/2007 | Chang et al. | 382/169 |

* cited by examiner

*Primary Examiner* — Aaron W Carter

(57) ABSTRACT

Embodiments of the present disclosure provide a method for adjusting parameters of an algorithm for enhancing an image. In various embodiments, the method includes automatically analyzing an image to identify at least one image attribute; based on the at least one image attribute, automatically determining a value of at least one parameter for an image processing algorithm; and applying the value of at least one parameter to the image processing algorithm. Other embodiments are also described and claimed.

20 Claims, 8 Drawing Sheets

METHOD AND APPARATUS FOR AUTOMATICALLY TUNING A PARAMETER OF AN IMAGE ENHANCEMENT ALGORITHM BASED ON AN ATTRIBUTE OF AN ORIGINAL IMAGE

CROSS REFERENCE TO RELATED APPLICATIONS

The present non-provisional application claims priority to U.S. provisional application No. 61/112,890, filed on Nov. 10, 2008, titled "AUTOMATED PARAMETER TUNING OF SHADOW/HIGHLIGHT ENHANCEMENT ALGORITHMS BASED ON ORIGINAL IMAGE CHARACTERISTICS," and is related to U.S. non-provisional application Ser. No. 12/576,501, filed on Oct. 9, 2009, titled "SHADOW AND HIGHLIGHT IMAGE ENHANCEMENT," the entire specifications of which are hereby incorporated by reference except for those sections, if any, that are inconsistent with this specification.

TECHNICAL FIELD

Embodiments herein relate to the field of image processing, and more specifically, to automatic determination and/or tuning of image processing and enhancement algorithm parameters based on original image characteristics.

BACKGROUND

With the advent of digital computing, including digital photography, there has been an explosion in the amount of digital images, such as photographs and video, that are generated and transmitted by electronic imaging equipment, such as digital cameras, camcorders, copiers, scanners, PDAs (Personal Digital Assistant), cell-phones, and the like. A great deal of such images are created by amateur photographers, using imaging equipment with limited dynamic range (difference between highest and lowest values of a variable quantity such as light intensity, frequency, and the like,) under unsuitable lighting conditions, and/or a combination thereof, resulting in sub-optimal images having various visual deficiencies such as overly dark or bright segments or otherwise bad lighting, blur, noise, poor color, graininess, distortions, and the like.

One of the image quality shortcomings in many images, such as photographs, is that when a poorly lit scene is captured, some of the original scene detail is lost in the regions of the image that are dark (shadows) and/or bright (highlights) compared with other regions of the image. This is particularly notable when a scene contains mixed lighting where there are combinations of shadows, highlights, and medium regions that are captured in a single image. This shortcoming may be caused by the limited dynamic range and/or imperfect exposure settings of the image capture device, among other causes.

A variety of techniques have been used to address image deficiencies. One technique to enhance an image is to adjust the lighting of the original scene so that there is limited dynamic range in the scene that is to be captured, for example, by eliminating overly dark and/or overly bright areas in the scene. Other than in a studio where lighting may be adjusted professionally, adjusting the lighting of a scene may be difficult at best and impossible at worst because of lack of control of the scene, equipment, knowledge, or any combination thereof.

Another technique to improve an image is to capture the scene with a device with better dynamic range, focus, light metering, various compensation schemes, and the like. This technique also presents limited opportunities for improvement due to unavailability of suitable equipment, time constraints, lack of control over the scene or equipment, and the like. Additionally, the quality of a captured image is generally not known until after it has been captured.

Still another technique to enhance a captured image is to post-process the captured image to enhance the detail of the overly dark and/or bright regions of the image and/or make other enhancements. Processing an image after image acquisition is usually possible and desirable in most circumstances because the constraints for post-processing are fewer. However, most conventional image processing methods are based on image processing algorithms with a number of settings or parameters that are preset to default values, are adjusted by the user in a trial and error process, or otherwise are set without being directly based on the characteristics and attributes of the original image. For example, a user controlled software package such as Photoshop® may be used to enhance captured pictures by iteratively tuning the available parameters to converge on an acceptable solution (enhanced image). This process can be a complex and time consuming task and may yield less than optimal results. Such conventional methods for setting the parameters of image processing algorithms are generally sub-optimal for a particular image and may introduce other undesirable visual artifacts in the enhanced image.

SUMMARY

In an embodiment, the present disclosure provides a method for adjusting parameters of an algorithm for enhancing an image, the method comprising automatically analyzing an image to identify at least one image attribute; based on the at least one image attribute, automatically determining a value of at least one parameter for an image processing algorithm; and applying the value of at least one parameter to the image processing algorithm. In various embodiments, the method further comprises obtaining another image attribute based on metadata associated with the image.

In various embodiments, the present disclosure also provides an apparatus for adjusting parameters of an algorithm for enhancing an image, the apparatus comprising a processor configured to execute instructions; a storage device coupled with the processor, the storage device having instructions stored thereon that when executed cause the apparatus to automatically analyze an image to identify at least one image attribute; based on the at least one image attribute, automatically determine a value of at least one parameter for an image processing algorithm; and apply the value of at least one parameter to the image processing algorithm. In various embodiments, the instructions stored on the storage device, when executed, further cause the apparatus to automatically determine a value of at least one parameter using an indexed table, and automatically determine a value of at least one parameter using at least one function and/or an algorithmic program.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1A:
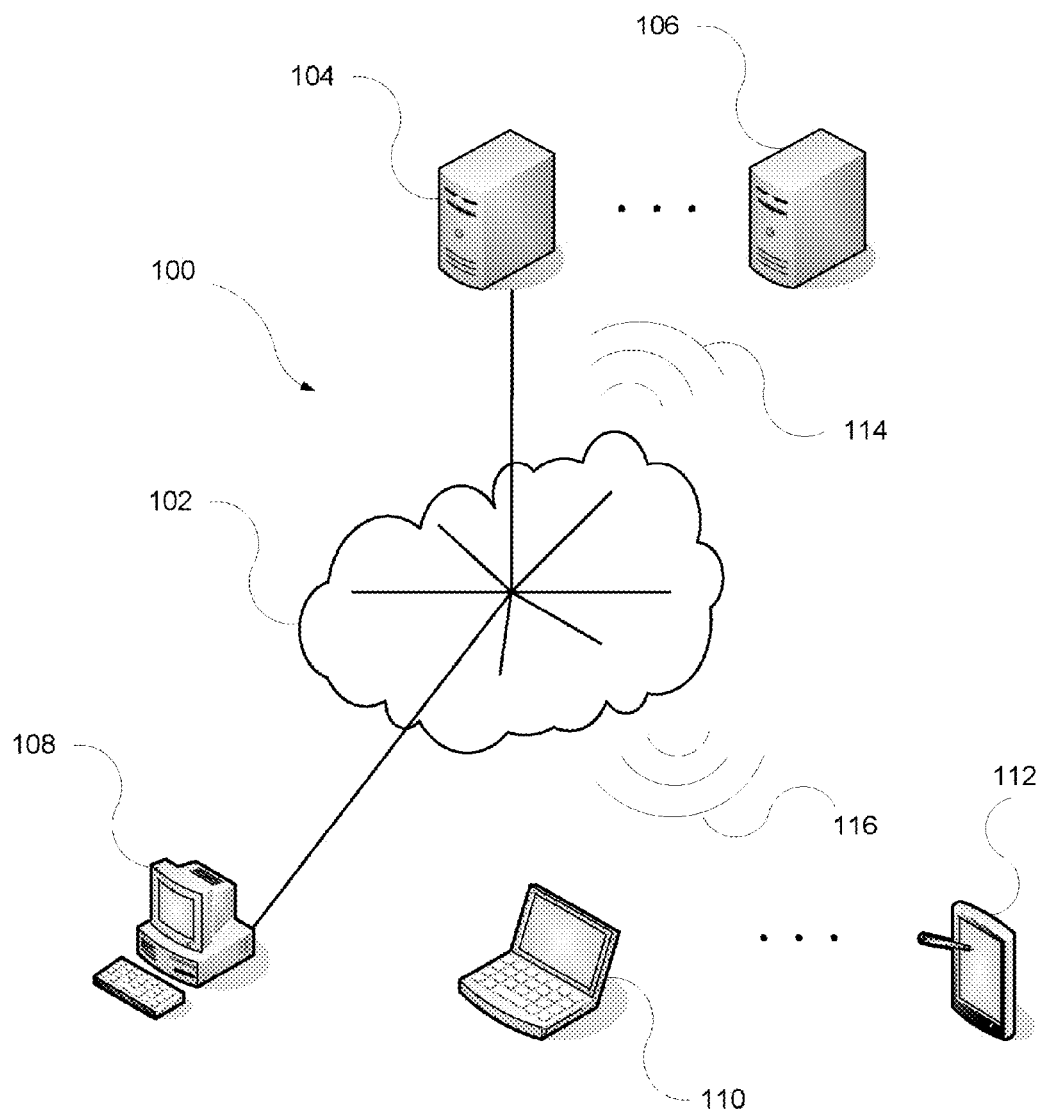
FIG. 1A illustrates a network environment where various computing devices may communicate, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other via one or more intermediate elements or components.

For the purposes of the description, a phrase in the form "A/B" or in the form "A and/or B" means (A), (B), or (A and B). For the purposes of the description, a phrase in the form at least one of A, B, and C" means (A), (B), (C), (A and B), (A and C), (B and C), or (A, B and C). For the purposes of the description, a phrase in the form "(A)B" means (B) or (AB), that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for enhancing an image by post-processing computations based on original image attributes are provided. In example embodiments, a computing system may be endowed with one or more components of the disclosed apparatuses and/or systems and may be employed to perform one or more methods as disclosed herein.

Embodiments herein provide a method and system for enhancing an image using image processing and enhancement algorithms the parameters of which are set, adjusted, or tuned based on characteristics of the image. The algorithms' parameters may be automatically adjusted based on the attributes of the original image. A variety of image attributes exist that may be correlated to the algorithm parameter settings. By analyzing these image attributes individually, and/or as a group, algorithm parameter adjustment factors (multipliers) or values may be derived/determined that deliver near-optimal image enhancement results similar to results obtained from manual/iterative tuning by experienced operators.

The automatic parameter setting process, further described below, allows the setting of algorithm parameters used to enhance at least the contrast of pixels (picture elements) and reveal image details in overly dark or overly light regions, relative to other regions, of the image and reduce the computational complexity and resources needed in existing image processing algorithms, while reducing visual artifacts, such as color fringing, low contrast, moirés, blurring, aliasing, graininess, noise, image distortion, and the like, that may be introduced by using sub-optimal parameter values for the image processing/enhancement algorithms.

The disclosed techniques may be used to determine near-optimal parameter values of algorithms used to enhance an original image, for example, improve contrast, by sub-sampling the original image (to reduce the number of pixels and corresponding computational load), identifying and/or deriving local region brightness (dark and light regions within the image) by, for example, using a 2-D Gaussian filter, and applying the local region brightness to the original image to enhance the contrast of pixels within these regions in the original image. Application of the dark/light regions to the image may be accomplished using a lookup table that is flexible and may be configured to implement a variety of techniques, for example, contrast overlay, Alpha blending, and the like, further described below, for contrast enhancement in these regions.

FIG. 1A illustrates a network environment where various computing devices may communicate in accordance with various embodiments. Network environment 100 includes a computer network 102 coupling various computing devices for communication and exchange of information. Computing devices may include servers 104 and 106 coupled to network 102 by wire or wireless. Other computing devices, such as client devices like PC (Personal Computer) 108, laptop computer 110, PDA 112, and the like may also be coupled to each other or servers via network 102.

Generally, any computing device, which includes a network interface module may connect to network 102 and communicate with other computing devices. Such computing devices may include telephone devices, such as cell phones, satellite phones, and the like, appliances with network interface such as televisions and some refrigerators, industrial equipment and machines, cash registers, data terminals, intelligent sensors, and the like. Some computing devices may be connected to network 102 directly via a wired connection, while others may be coupled with network 102 via wireless networks 114 and 116.

Computer network 102 may be a LAN (Local Area Network), WAN (Wide-Area Network), Internet, World Wide Web, and any other computer network capable of providing communication paths and protocols for computing devices to communicate. Various protocols exist for communicating over a computer network. For example, HTTP (Hyper Text Transfer Protocol) and TCP/IP (Transmission Control Protocol/Internet Protocol) are some of the common protocols that are used for data exchange, while HTML (Hyper Text Markup Language) and ASP (Active Server Pages) are languages generally used for Web page programming and communicating over the Web.

Figure 1B:
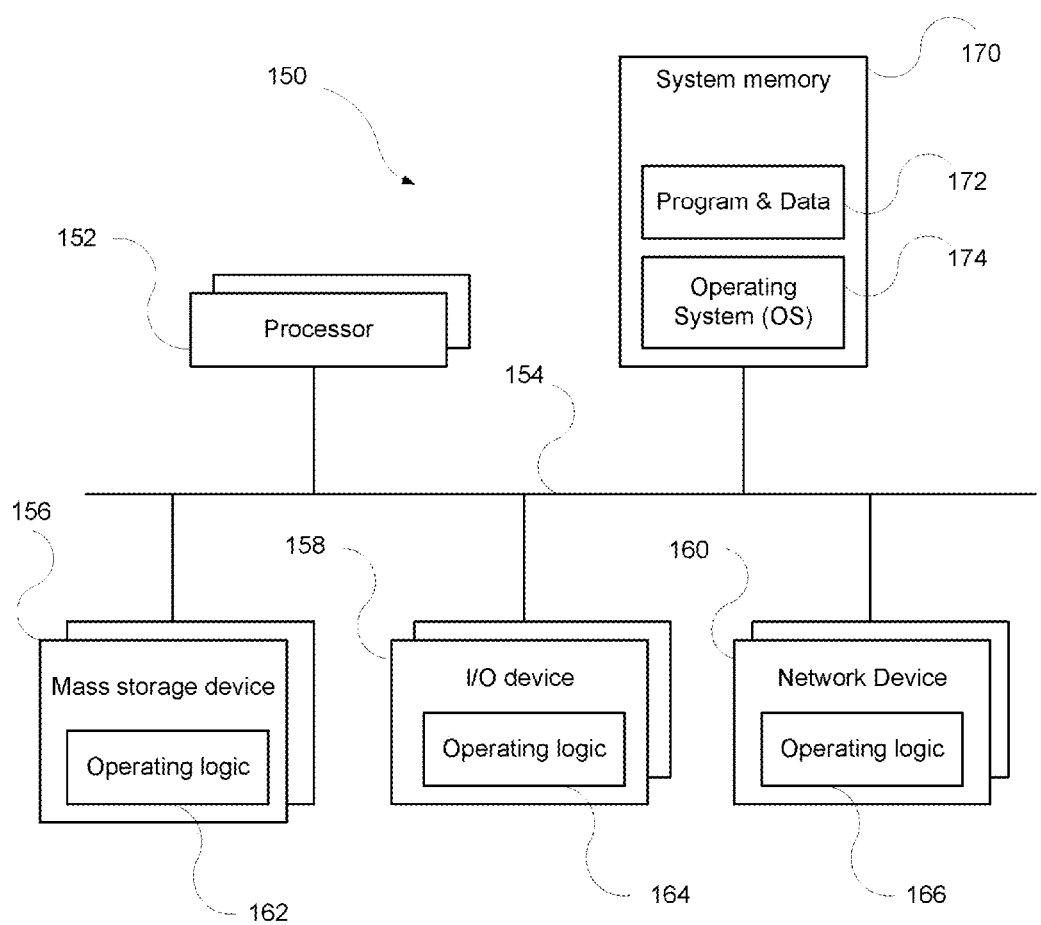
FIG. 1B illustrates details of a computing device corresponding to the computing devices of the network environment of FIG. 1A, in accordance with various embodiments.

FIG. 1B illustrates details of a computing device corresponding to the computing devices of the network environment of FIG. 1A in accordance with various embodiments. System and/or computing device 150 includes one or more processors or processor cores 152, a system memory 170, a system bus 154, mass storage devices 156, I/O (Input/Output) devices 158, and network interface devices 160. System memory 170 generally includes an OS (Operating System) for managing the operations of the computing device 150 and additional storage areas 172 for storing software application program and data. Each of the mass storage devices 156, I/O devices 158, and network interface devices 160 may also have built-in and/or locally loadable firmware to provide operating logic 162, 164, and 166, respectively. Operating logic may include various device drivers, data handling functions, data buffering, data filtering, and the like.

For the purpose of this application, including the claims, the terms "processor" and "processor cores" may be considered synonymous, unless the context clearly requires otherwise. Mass storage devices 106 may include storage devices such as diskette, hard drive, compact disc read only memory (CDROM) and so forth. I/O devices 108 may include keyboard, keypad, touchpad, display, lights, fan, camera, microphone, parallel and serial ports, for example, USB (Universal Serial Bus) port, FireWire, HDMI (High Definition Multimedia Interface), and the like. Additionally, other external I/O devices, such as scanner, video and/or still picture camera, printer, external or supplemental monitor/display, external storage devices, copier, and the like may be coupled with computing device 150 via common I/O buses such as SCSI (Small Computer System Interface), USB, serial cable, parallel cable, and the like (not shown). Network interface devices 160 may include communication devices such as wired and wireless Network Interface Cards (NIC), modems, LAN, Ethernet, and so forth. The components shown in FIG. 1B are coupled to each other via system bus 154, which may represent one or more buses, such as local bus, front-end bus, dedicated memory bus, and the like. In the case of multiple buses, the multiple buses may be coupled to each other or bridged by one or more bus bridges (not illustrated).

Each of the elements shown in FIG. 1B performs its conventional functions known in the art. In particular, system memory 170 and mass storage 156 may be employed to store a working copy and a permanent copy of the programming instructions implementing all or a portion of below described functions, herein collectively denoted as 172. The instructions 172 may be assembler instructions supported by processor(s) 152, instructions that can be compiled from high level languages, such as C, or scripting languages such as Perl.

The permanent copy of the programming instructions may be placed into permanent storage 156 in the factory, or in the field, through, for example, a distribution medium (not shown), such as a compact disc (CD), or through communication interface 160 from a distribution server (not specifically shown) over network 102 of FIG. 1A. That is, one or more distribution media having instructions 172 may be employed to distribute the instructions 172 and program various client devices. The constitution of these elements 152-174 are generally well known, and accordingly will not be further described.

In various embodiments, system 150 may be configured to operate as client device 108-112 of FIG. 1A. In various embodiments, system 150 may have a Microsoft Windows® operating system (e.g., Windows XP, Vista, etc.) or other operating systems installed. One or more instructions stored in system memory 170 and/or storage device 156 may cause system 150 to perform the methods described in the present disclosure. Client devices of FIG. 1B may be coupled with network 102 and other devices on the network via wired or wireless connections directly or through a proxy server and/or through an Internet Service Provider (ISP), indirectly.

In various embodiments, computing device (or system) 150 may also be configured to operate as servers 104 and 106 of FIG. 1A coupled with network 102 via wired or wireless NICs. Servers 104 and 106 may represent server farms including multiple server machines. Servers 104 and 106 may also include multiple software and/or virtual servers on a single hardware platform, such as internet information servers, web servers, file servers, application servers, domain name servers, routers, and the like, providing appropriate services to the client devices described above.

Although a limited number of common computing components are shown in FIG. 1B for computing device (or system) 150, those skilled in the art will appreciate that many other components may be included in computing device 150. For example, non-volatile memory, such as ROM (Read Only Memory), Flash, and the like, DMA (Direct Memory Access), multi-touch screens, math coprocessors, graphic accelerators, frame grabbers (for video capture applications), and many other devices, modules, and components may be included in a computing device. Conversely, some of the components shown in FIG. 1B may not be included in a computing device. For example, a computing device, such as a phone, may not include a mass storage device, such as a hard disk or an optical drive.

Although the components shown in FIG. 1B are shown as discrete components, those skilled in the art will appreciate that these components or their respective functions may be implemented at various levels of integration. For example, I/O device and network device interfaces 158 and 160, respectively, may implemented as one unit, such as a circuit board. Conversely, a component shown as a single module, for example, mass storage device 156, may be implemented by distributing the component's corresponding functions over multiple modules and sub-components. For example, a mass storage device may be decomposed into a storage unit and a controller unit to implement the full functionality of a storage device.

In various embodiments, computing devices and configurations shown in FIGS. 1A and 1B and described previously may be used in various combinations to perform the methods of the present disclosure for setting parameter values for algorithms that may be used for processing and enhancing an original image based on the attributes of the original image, improving contrast and detail in dark or bright regions, and reducing the need for computing time and resources for image processing by sub-sampling the original image, while avoiding the introduction of visual artifacts as a result of the image processing. For example, the entire automatic parameter setting process may be implemented in one computing device, such as a PC, or the process may be implemented using a combination of multiple PCs, servers, copiers, scanners, and the like, each one or more of such computing devices performing one or more specialized tasks. For example, in an embodiment, one PC may be used to receive an original image from a scanner, a database, or other data storage facility, analyze the image to determine its attributes and send the image attributes to an image processing server or service, where the settings of algorithm parameters are determined based on the image attributes and sent back to the one PC to be applied to the algorithms implemented in a software package, such as Photoshop®, to be used for image enhancement.

Figure 2A:
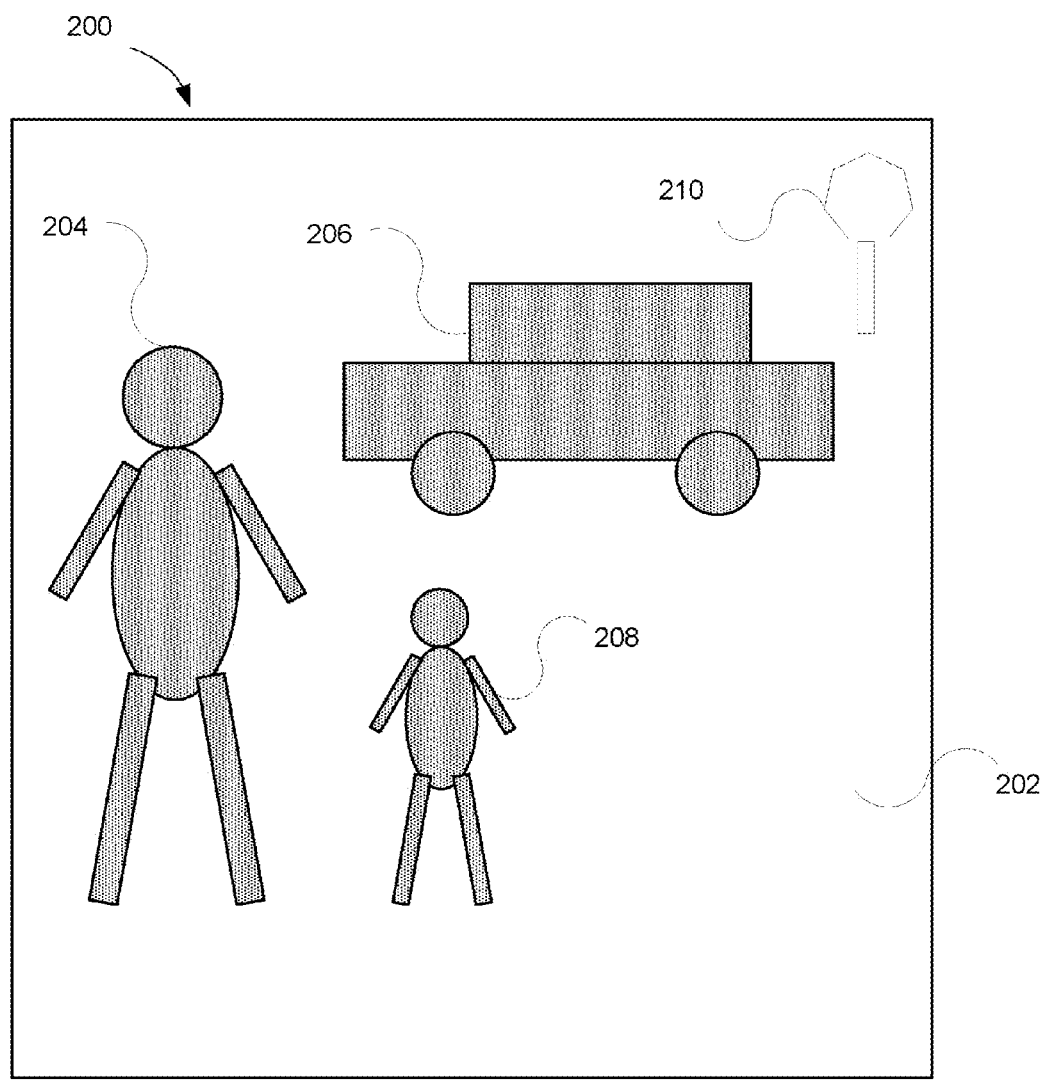
FIG. 2A illustrates an original image suitable for processing using various embodiments.

FIG. 2A illustrates an original image suitable for processing using various embodiments. Example image 200 shows an adult 204, a child 208, and a car 206 against a bright background 202, with a sign post 210. The objects and people in this example image are seen substantially as shadows (dark regions of the image) with little of their internal details being visible. Background 202, in this example image, is seen as highlight (bright region of the image), with "washed out" details (not shown). Such images are common when a picture is taken/captured against a bright background or other bright light source in the scene, where the photographic equipment, for example, a video or still image camera, adjusts exposure according to the bright region or background light level, under-exposing the objects and/or people in the foreground and obscuring the colors and details of the foreground objects/people.

This is a typical example of poor image quality that can occur in a typical mixed lighting situation. In this example, the well lit background (for example, the outdoors) results in an exposure setting that causes the details of the darker foreground objects (people and car) to be obscured. In addition, the exposure compensation for the dark foreground objects causes brightly lit objects in a brighter image segment or the background (for example, trees and buildings—not shown) to become "washed out" or over-exposed, leaving faint colors/features and pixels with low-contrast, delivering a double reduction in final quality: under-exposed or dark objects/regions (for example, foreground objects and people) and over-exposed or bright objects/regions (for example, background objects.)

Given an original image with lighting characteristics described above, the parameters of image enhancement algorithms, further described herein, may be set based on the attributes of the original image to enable these algorithms to be used to near-optimally enhance the contrast within the dark and bright regions, revealing more of the details in such regions. Some of the image enhancement and processing algorithms that are suitable for automatic parameter setting include one or more of calculation of color image intensity using a maximum value from multiple color channels (for example, Red, Green, Blue or RGB), image sub-sampling for use in intensity image base layer derivation, application of a multi-scale filter, such as a two-dimensional (2-D) Gaussian filter, to the sub-sampled image to blur the sub-sampled image and derive local region brightness (image base layer), configurable application of the image base layer to enhance image quality in shadow (dark) and highlight (bright) regions, and use of configurable/programmable hardware for shadow and/or highlight enhancement.

One image processing algorithm, which has parameters that may be automatically set based on original image attributes is sub-sampling. Sub-sampling is one technique to reduce the amount of computational time, complexity, and resources needed to process an image, by, for example, reducing the number of pixels that need to be processed. Sub-sampling an image, in effect, reduces the resolution of the image without removing any one-piece portion or chunk of the image. Sub-sampling may be done in various ways. In various embodiments, one method of sub-sampling is to select or sample every N-th pixel of the image from a linear sequence of all pixels in the image (for example, numbered sequentially from first to last pixel in the image), for some integer constant N, the sampling frequency, such as 2, 4, or 8. Another, non-linear, method of sub-sampling is to average the values of N neighboring pixels to form one super-pixel replacing the N pixels. For example, a grid of 4×4 pixels may be averaged to form one pixel replacing the grid of pixels.

If the pixels in an image are modeled as a two-dimensional X-Y grid, then another method of sub-sampling an image is to sample every M-th pixel in the X-direction, the X-sampling frequency, and sample every N-th pixel in Y-direction of the X-Y grid, the Y-sampling frequency, where M and N are integer constants. The sub-sampled image will include the pixels that were sampled both in the X and Y direction. In effect, this method is an area-based sampling method as opposed to a linear sequential sampling method. For example, with M=2 and N=2, an area-based sub-sampling will sample every other pixel in every other row and every other column. Area-based sampling may include box-averaging the sub-sampled pixels (e.g., replacing each pixel with the average value of pixels in the same predefined neighborhood containing each pixel).

Any type of sub-sampling of a signal or a sequence of quantities (such as pixels, in this case), linear or area-based, may cause aliasing due to violation of the Nyquist sampling rate criteria, where a signal is sampled at least at twice the bandwidth of the signal to avoid aliasing (aliasing occurs if two different sampled signals become indistinguishable due to low sampling rate.) Therefore, values for the sub-sampling algorithm parameters M and N should be chosen carefully to avoid aliasing problems. Additionally, optimal values of M and N may also depend on image attributes. For example, an image with large uniform segments may be more suitable for large M and N values than more detailed images with more high-frequency components.

Random sub-sampling, with certain constraints on the range of random numbers to prevent skipping too many pixels in the process, may also be used in some embodiments. Another method is to use a combination of sampling every N-th (or every M-th and N-th in area-sampling methods) pixel and further average the values of the sub-sampled pixels in a defined neighborhood of pixels to generate a sub-sampled image from the original image. Yet another method of sub-sampling is to use a combination of some or all of the above methods. Random sub-sampling algorithm parameters, such as random number range constraints, may depend on one or more image attributes and thus may be suitable for automatic parameter setting.

As noted above, image sub-sampling is a procedure used to reduce the amount of data needed to represent an image, thus, decreasing computational load for processing such image. The sub-sampled image may be used for extraction of an image "base layer", which includes dark and light regions corresponding to the original image but with less detail than the original image. This image base layer is calculated and stored at a substantially reduced resolution compared to the original image. However, the image base layer is used in a way, further described herein, that allows the original full image details and resolution to be preserved while enhancing the shadow and highlight areas of the image. The use of the sub-sampled image base layer may greatly reduce the amount of storage and calculations required in other steps of the image enhancement process without substantially sacrificing output image enhancement quality.

Another image processing algorithm, which has parameters that may be automatically set based on original image attributes is pixel intensity modification. When processing color images, it is often necessary to calculate a perceived intensity of the image at each pixel location. The goal is to model the Human Visual System's (HVS) perceived intensity of the image. This information can be used to control the type and amount of adjustment that will be performed on the image. The perceived intensity is an important component for a variety of image processing/enhancement algorithms. For example, perceived intensity can be used to control the amount of contrast enhancement applied to an image to correct for under or over exposed regions. In one embodiment, the calculation of perceived intensity is based on a linear conversion of the multiple color space data values (for example, Red color values or Green color values) into a single intensity value. For example, a pixel with RGB data values is typically converted to a single intensity value based on a weighted linear combination of RGB values, such as:

$$\text{Image Intensity} = A*R + B*G + C*G \tag{1}$$

where A, B, and C are weights or coefficients/multipliers for the Red (R), Green (G) and Blue (B) data values.

The coefficients A, B, and C may be determined based on at least one or more attributes of the original image. For example, if a particular basic color, such as red (R, in RGB), has higher variability and/or range in the original image, then the weight of the particular basic color may be increased to make it the dominant intensity based on which the image intensity is determined, because higher variability may improve contrast. As another example, average pixel intensity and proportions of low and high intensity areas in the original image may be combined, for instance, using an iterative or empirical technique, to pre-determine and/or tabulate near-optimal values for coefficients A, B, and C as a function of these image characteristics. These coefficients may be determined based on other constraints as well, such as having fractional weights that add up to 1.0. However, more complex (for example, nonlinear) combinations of other original image attributes, such as the individual, and/or neighboring, color plane values may also used to determine these coefficients.

In another embodiment, rather that calculating the perceived intensity of the image based on a linear combination of the individual color planes, the maximum value across all color planes may be used to represent the intensity for each pixel. For example, Intensity of an RGB pixel may be calculated as follows:

$$\text{Pixel Intensity} = \text{Maximum}(R, G, B) \tag{2}$$

where R, G, and B represent pixel values for each of the red, green, and blue color planes, respectively. The Maximum ( ) function returns the maximum value of its three arguments compared to each other on a per-pixel basis. For example, Maximum(98,210,143)=210.

The processes described herein are equally applicable regardless of the image representation chosen or available, because various representations, for example, YCbCr, may be converted to other representations. For brevity and clarity, only RGB representation of images is used for discussion in this disclosure.

Another image processing algorithm, which has parameters that may be automatically set based on original image attributes is blurring. Blurring is one of the techniques used to enhance the details in the shadow and highlight regions, as further described below. One aspect of enhancing shadow and highlight regions of an image is the ability to determine which regions are shadows and which regions are highlights. Generally, this determination may not be possible at pixel-level, that is, by examination of individual pixel values, since the scene details in the image may include both light and dark objects in both shadow and highlight regions. In various embodiments, one technique to reduce the image to "regions" is to apply a strong region based blur (e.g., processing a pixel based on pixel vales of neighboring pixels in a region) to the original image. This technique effectively reduces local detail leaving behind the relatively broader lighting information. For example, this approach may include applying a typical box-averaging blur (e.g., replacing each pixel with the average value of pixels in the same predefined neighborhood containing each pixel) to the image. This technique may remove edge detail between shadow, highlight, and medium regions of the image. Using this output for further shadow/highlight enhancement may result in visible image artifacts at/near these edges. Another approach is to use an edge-preserving blur such as a bi-lateral filter. These types of filters are generally expensive in terms of computational resources and when used in conjunction with base-layer sub sampling, they may produce visible image artifacts.

In another embodiment, a specially designed multi-scale Gaussian blur filter may be applied to the sub-sampled image. During application of such a filter, the image is convolved (e.g., in a convolution operation) with a Gaussian function, and an image base layer is generated. Such image base layer estimates local region brightness without excessive computational complexity and with sufficient preservation of shadow, highlight, and medium brightness edges to avoid visible enhancement artifacts when using the base-layer for shadow/highlight image enhancement. The multi-scale Gaussian filter is also compatible with the sub-sampling approaches described above, which allows large regions of the image to be averaged without an excessive filter size. For example, a 21×21 Gaussian filter, which is described by the following equations, may be suitable for most images.

$$g(x, y, \alpha) = e^{-(x^2 + y^2)/(2\sigma^2)} \tag{3a}$$

$$h(x, y, s) = \frac{g(x, y, s/6)}{\sum_{x=0}^{x=s} \sum_{y=0}^{y=s} g(x, y, s/6)}; \tag{3b}$$

for $x$ and $y < s$; otherwise $h(x, y, s) = 0$;

$$\text{filter}(x, y) = \frac{h(x, y, 21) + h(x, y, 9) + h(x, y, 3)}{3} \tag{3c}$$

Where g( ) is the 2-D (two dimensional) Gaussian function, x and y are variables in the X and Y directions of the image grid, respectively, σ is the standard deviation, and h( ) is the transfer function. The constants in equations 3a-3c are numbers determined from empirical experimentation and analysis of the resultant image quality and computational complexity. In various embodiments, these constants are used as values that give good image quality results without introducing excessive computational complexity. In other embodiments, larger values may be used to gain a small improvement in image quality for a large increase in computational complexity and/or time. Specifically, the constants 3, 9, and 21 determine the extent/size of three Gaussian filters that are combined to create a multi-scale Gaussian filter. As shown in the equations, each of the filters produces a zero value outside its "s" value (i.e., x and y≥s, equation 3(b)). The constant 6 is a standard value used in digital Gaussian filtering, essentially, creating a Gaussian filter that tails off to zero at the extent of "s" value.

Various filter parameters, such as the filter dimension of 21×21, filter coefficients, and the like, may be determined based on the attributes of the original image. For example, a higher or lower dimension filter may be used depending on a combination of the amount of detail in low, medium, and high intensity areas of the original image, original image size, amount of time available for the enhancement process, and/or the like.

The image base layer so obtained may be used in a later stage of the image enhancement process to improve pixel contrast and image quality in the enhanced image.

Another image processing algorithm, which has parameters that may be automatically set based on original image attributes is "up-sampling." The sub-sampled and blurred image described previously constitutes an intermediate image that may be stored for subsequent use, for example, to the mass storage device 156 of FIG. 1B. Due to the sub-sampling and pixel intensity modification (for example, as shown in equation (2)) of the pixels in the original image, the storage of the sub-sampled and blurred image may need about 1/100 to 1/200 times the storage space of the original image, depending on the sub-sampling and blurring techniques and parameters used. To obtain the resolution of the original image in an enhanced image (resulting from the image enhancement process,) up-sampling of pixels in the saved intermediate image may be performed, whereby the same number of pixels as the original image is restored to allow a pixel-by-pixel application of the image base layer to the original image and generate the enhanced image.

Generally, the up-sampling of the intermediate image (resulting in an up-sampled intermediate image) that is needed to restore the original image resolution (or number of pixels) is computationally relatively inexpensive and can be done "on the fly" or dynamically as both the original image and saved intermediate image are scanned for further processing. Up-sampling may be applied using different techniques, including, for example, interpolation of values of adjacent pixels, bilinear interpolation of values of pixels on a grid (a two-dimensional interpolation), and non-linear region-growing techniques whereby the number of pixels are "grown" within an image segment based on various criteria, such as frequency distribution and other image characteristics.

Up-sampling parameters, such as size of pixel neighborhoods/regions or interpolation parameters may be determined based on original image attributes.

Figure 2B:
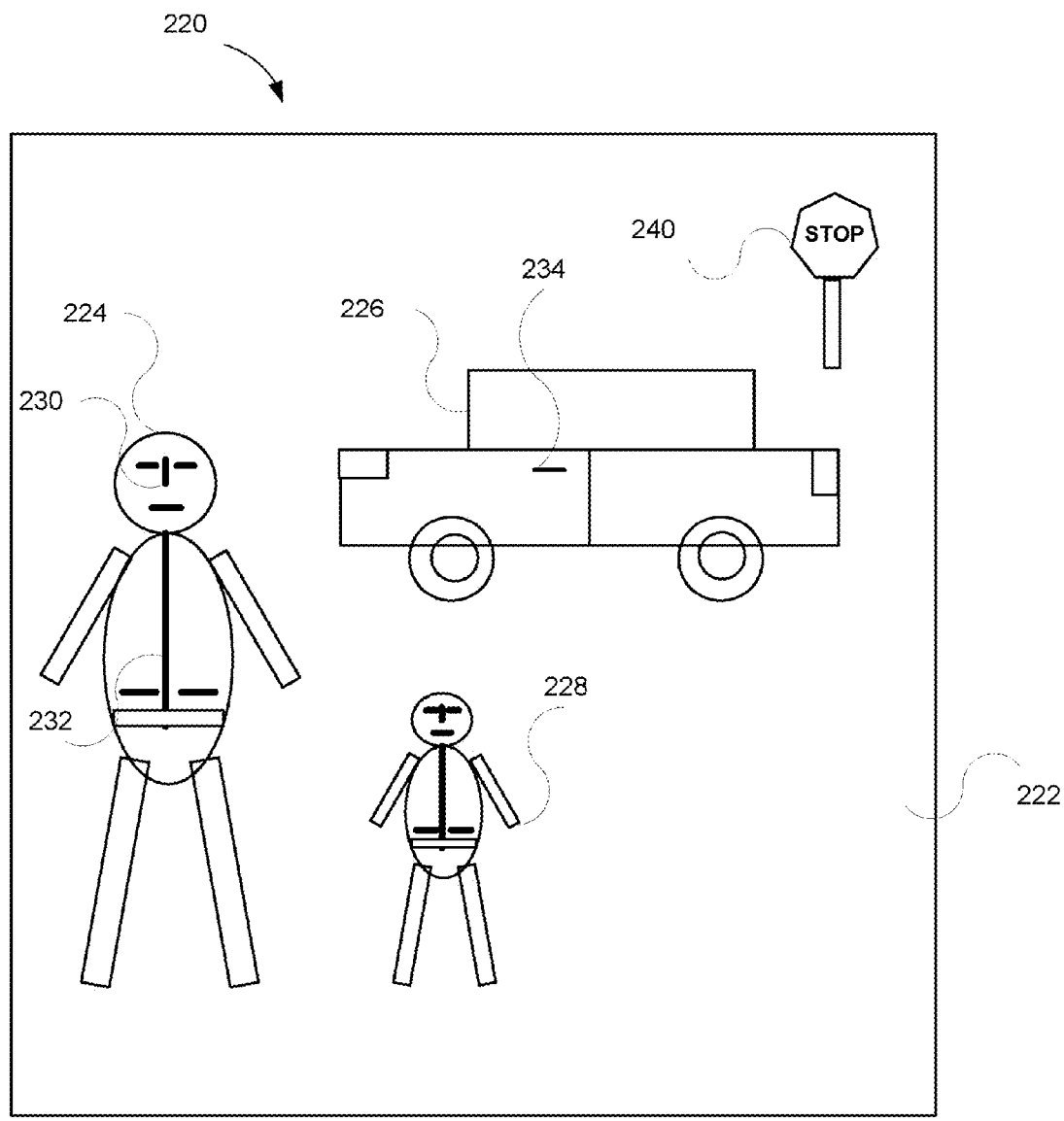
FIG. 2B illustrates an enhanced version of the original image of FIG. 2A, in accordance with various embodiments.

FIG. 2B illustrates an enhanced version of the original image of FIG. 2A in accordance with various embodiments. Enhanced image 220 has the same elements of original image 200 of FIG. 2A, namely, an adult 224, a child 228, a car 226, and a background 222. However, the enhanced image 220 has more visible details and better contrast in the shadow and bright areas. For example, the more visible details in the enhanced image 220 includes facial features 230 and clothing features 232 of adult 224, and some details of car 226 (e.g., door handle 224). Stop sign 240 is an example of enhanced details in the bright background 222. The text "STOP" on stop sign 240 that was not visible on sign post 210 of FIG. 2A, is enhanced and has become visible in the enhanced image 220. Enhanced image 220 is an example of the result of applying the image enhancement algorithms, as further described below.

Another image processing algorithm, which has parameters that may be automatically set based on original image attributes is the application of the derived local region brightness to the original image. The application of the derived local region brightness (e.g., as estimated by and embodied in the image base layer) to the original image using a mapping (further described herein), provides enhancement of shadow and highlight regions, and generates the enhanced image. Generally, for contrast and detail enhancement in dark and bright regions of an image, the contrast of pixels (difference to the background or surrounding pixels), in both shadow (or dark) and highlight (or bright) regions, should be increased. To increase the contrast in shadow regions, pixels lighter than the base layer are made brighter. To increase the contrast in highlight regions, pixels darker than the base layer are made darker. The determination of how much modification should be made to each pixel value, what level of brightness constitutes a highlight or shadow, and how to smoothly transition the enhancement between various shadow, highlight, and medium regions affect the final enhancement results. Such determinations may be made based on user preferences, predetermined empirical criteria, feedback process whereby parameters are adjusted until a satisfactory result is obtained, original image characteristics, and the like.

A relatively large variety of mapping techniques are available using the original pixel value and the image base layer. One or more of these mapping techniques compute a new value for an output pixel (e.g., resulting from a sequence of transformations of pixels, as described herein in terms of the image enhancement process) and convert the original image to the enhanced image. Such mappings determine the correspondence between pixels in the up-sampled image base layer to pixels in the original image.

In various embodiments, an example "contrast overlay" mapping may be used. This mapping is applied using the following equations where "B" is the value from the generated image base layer, "I" is the original image, "inverse(x)" is the negative or inverse of a value x (for example, inverse(x)=1−x), and "Iout" is the intensity of the output or resultant pixel (in the enhanced image). This mapping implements a conditional inversion of output pixel intensity based on the range of values of I in the original image.

$$Iout = I*2*B; \text{ For } I<0.5 \tag{4a}$$

$$Iout = inverse(inverse(I)*inverse(B)*2); \text{ For } I>0.5 \tag{4b}$$

Another example mapping is an Alpha-blend mapping implemented using the following equation. Alpha-blending is generally used for inducing a level of transparency in an image, where a higher level of alpha indicates more transparency. Alpha generally varies between 0 and 1, where 0 corresponds to complete transparency and 1 corresponds to complete opacity.

$$Iout = I*(B + inverse(B)*(k/(B+\text{offset})+1-k)), \tag{5}$$

where k is the alpha value that varies between 0 and 1.

Typical values for the above parameters are: offset=0.2; k=0.5; these values can be varied to change the amount and/or type of enhancement.

The parameters shown in equations (4) and (5) above, may be determined based on original image attributes. For example, the intensity conditions or thresholds used in application of equations (4a) and (4b) may be determined based on image attributes such as proportion of low, medium, and high intensity areas, and amount of detail in the same areas. Similarly, intensity inversion expressions in equation (5) may be determined based on these and other attributes, singly or in combination.

Other example mappings are possible for applying the derived local region brightness to the original image. The optimal mapping is dependent on the original image characteristics, the output media for the final enhanced image, the personal preference of the user, and a variety of other factors. Rather than select a fixed mapping, a technique may be used that allows an efficient application of a variety of mappings by using a look-up table that produces a scaling multiplier or coefficient value for each original image pixel. The look-up table is indexed by the derived local region brightness in the image base layer. At the indexed location, a multiplier is obtained from the look-up table and applied separately to each color plane in the original image to maintain the original color hue while enhancing the shadow and highlight detail. This look-up table approach allows implementation of both example mappings above.

The multiplication of original image pixels by the multiplier obtained from the look-up table, or otherwise from the example mappings, complete the application of image base layer to the original image, resulting in the enhanced image having better contrast and details of pixels in the dark and bright regions.

The image processing algorithms described above are a small subset of the many such parametric algorithms that may be used for image enhancement. The above algorithms were included to provide concrete examples of aspects of this disclosure and are not to be construed as limiting the concepts presented herein to the described algorithms. The automatic parameter setting process described herein is applicable to any algorithm the parameters of which may be optimally set based on the attributes of the original image.

Figure 3:
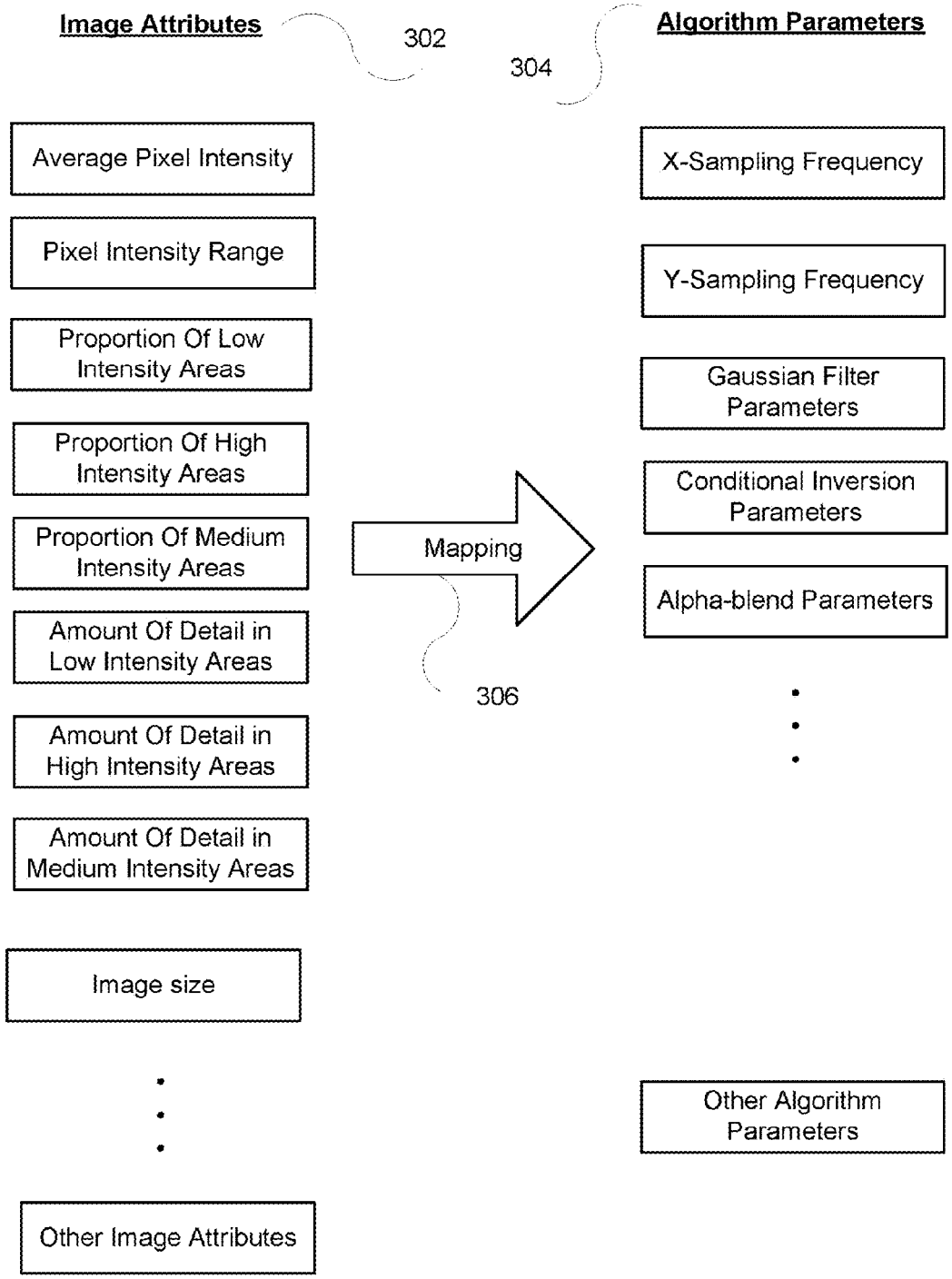
FIG. 3 illustrates an example mapping of image attributes to image processing algorithms' parameters.

FIG. 3 illustrates an example mapping of image attributes to image processing algorithms' parameters. Depending on the type of the original image, for example, portrait, landscape, action sports, and the like, hundreds or more image attributes may be defined and/or determined that may be suitable for near-optimally setting algorithm parameters. Conversely, many algorithms may be devised the parameters of which may be optimally set based on one or more image attributes. Image attributes may be used to characterize a particular image, or a general type of image. For example, characteristics/attributes of landscape images, where large, relatively uniform fields (for example, sky, sea, or snow) are shown, may be applicable in setting algorithm parameters for processing all landscape images. Additionally, the attributes of a particular image may be used to determine values for algorithm parameters to be applied specifically to the particular image only.

With continued reference to FIG. 3, image attributes 302 may include average pixel intensity, pixel intensity range, proportion of low, medium, and high intensity areas relative to each other, amount of detail in low, medium, and high intensity areas, image size, and/or the like. Algorithm parameters 304 may include X-sampling and Y-sampling frequencies (for sub-sampling algorithm), Gaussian filter parameters, conditional inversion parameters, Alpha-blend parameters, and the like. Mapping 306 generally relates image attributes to algorithm parameters by any mathematical, empirical, or other type of relationship. Mapping 306 indicates that one or more of algorithm parameters 304 may be near-optimally set based on one or more of image attributes 302, applied singly or in combination.

The aforementioned image attributes 302 and algorithm parameters 304 are examples presented for the purpose of illustration and are not to be construed as limiting the disclosure to such attributes and parameters. Image attributes 302 may be obtained by analyzing the original image using various image analysis techniques, statistical techniques, empirical techniques, and the like. Alternatively, image attributes 302 may be obtained based on metadata associated with the original image. The metadata may be stored in an image file associated with the original image, stored in a separate database, and the like. The metadata may include information with which the image attributes may be determined, or may include the image attributes directly.

One of the image attributes 302 is average pixel intensity. Average pixel intensity may be determined in a number of ways. For example, average pixel intensity may be based on arithmetic average or mean of all pixels in the original image, the median or middle value of all sorted pixel values, the mode or most frequently occurring pixel value, the geometric mean or n-th root of the product of n pixels. Additionally (or alternatively), average pixel intensity may also be based on using a moment function based on single or double integral (or summation for discrete values) of all pixels taken over an integration interval or area, respectively, and divided by the respective length or area. Other types of averages may also be used such as generalized mean, harmonic mean, weighted mean, and the like.

Another image attribute of the image attributes 302 is pixel intensity range, which represents, for example, the intensity difference between the brightest and the dimmest pixel in the original image.

Other image attributes of the image attributes 302 include proportion of low, medium, and high intensity areas relative to each other. These attributes may be expressed in terms of percentage values, histograms, or tabular data showing the relative proportions of one type of area relative to others. For example, an image may have 60% high intensity (bright) areas, 30% medium intensity (moderate lighting) areas, and 10% low intensity (dark) areas.

Another image attribute 302 includes an amount of detail in low, medium, and high intensity areas of the image. The amount of detail in an image region is generally indicated by differences in pixel-level intensities (as opposed to over the whole region) in terms of the range and distribution of pixel values within the image region.

Algorithm parameters 304 were described previously in the context of the respective algorithms.

Figure 4:
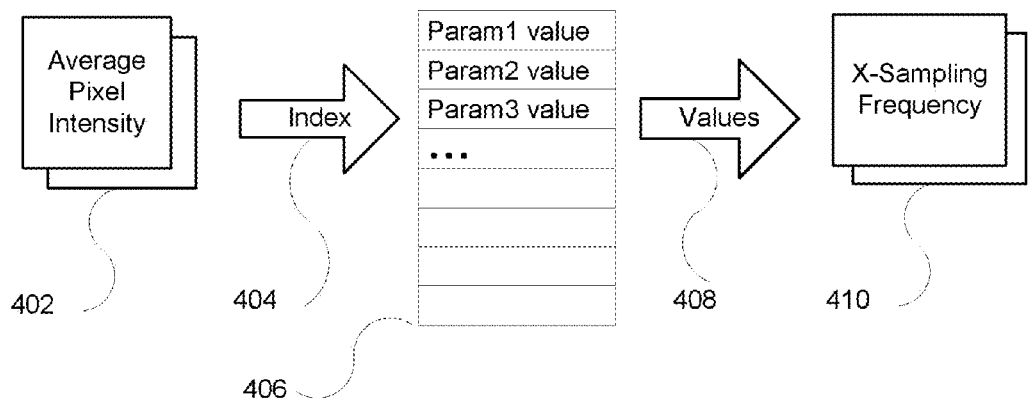
FIG. 4 illustrates using an example table to map original image attributes to image processing algorithms' parameters.

FIG. 4 illustrates using an example table to map original image attributes to image processing algorithms' parameters. One technique for mapping image attributes to algorithm parameters is the use of a table. In various embodiments, a table 406 may be arranged to include index values 404 determined by one or more image attributes 402 combined in a predetermined fashion. Once a particular index value is determined, a corresponding table entry on the same row defined by the particular index value is selected. The table entry includes output values 408 used, directly or indirectly, for setting the algorithm parameters 410 of a predetermined algorithm. Those skilled in the art will appreciate that many table arrangements, in the form of data structures, may be employed to implement a table-based mapping. Similarly, many indexing schemes, methods of combining image attributes to create index values, and output value configurations are possible. For example, image attributes 402 may be combined to create an index value 404 that selects output values 408 applicable to one or more algorithms pre-associated with the selected output values 408. Output values 408 may include algorithm parameter values (direct method,) or other values based on which the parameter values are determined (indirect method.)

In various embodiments, output values 408 may be scaling factors or multipliers that are used to scale base algorithm parameter values. For example, if a base parameter value is 5, and an output value includes a scaling factor of 2, then the automatically set algorithm parameter will be 5×2=10. Output values 408 may be offsets that are added to a base parameter. Additionally, output values 408 may be any number or rule/expression used in a formula/equation or parsed by a rule processing engine, respectively, to determine the value of the corresponding algorithm parameter. Output values 408 may also indicate a type of value that the output values include. For example, the output values 408 may include an identification field that identifies the content of the output value as a scaling factor, an offset, a rule or expression, and the like.

Output values 408 may be applied to or used to determine the algorithm parameters by a processing module, such as a software application program, that automatically determines and/or sets algorithm parameters based on the output values 408. Such software application program may correspond to program and data module 172 of FIG. 1B.

Figure 5:
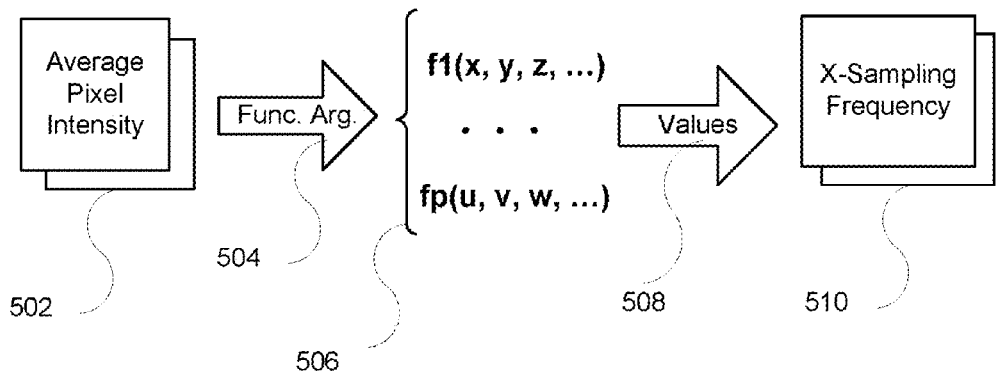
FIG. 5 illustrates using example functions to map original image attributes to image processing algorithms' parameters.

FIG. 5 illustrates using example functions to map original image attributes to image processing algorithms' parameters. Mapping of image attributes 502 may be performed by supplying arguments 504 to one or more functions 506. Functions 506 return/generate values 508 that may be used to determine values for algorithm parameters 510. Otherwise, the mapping operation using functions, as shown in FIG. 5 is similar to that of FIG. 4. Functions 506 may be analytical, empirical, statistical, and the like.

Figure 6:
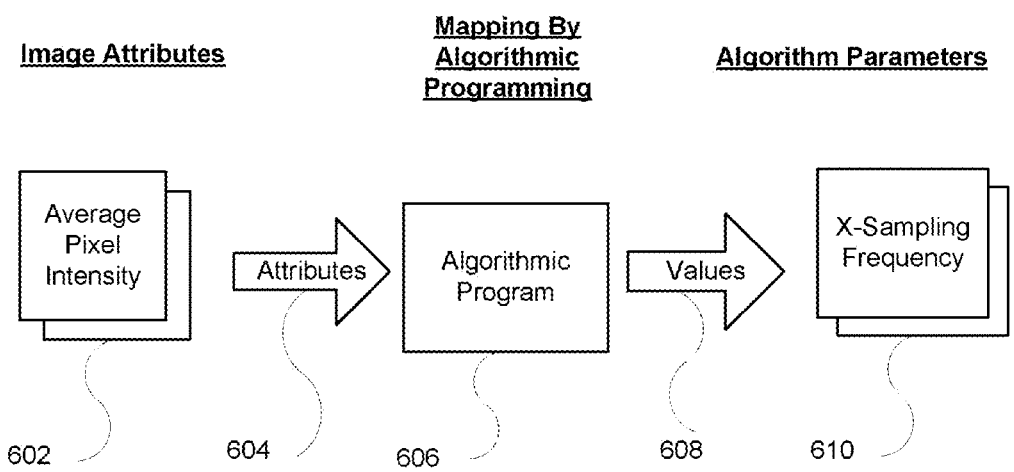
FIG. 6 illustrates using example algorithmic programs to map original image attributes to image processing algorithms' parameters.

FIG. 6 illustrates using example algorithmic programs to map original image attributes to image processing algorithms' parameters. Mapping of image attributes 602 may be performed by supplying selected attributes 604 to an algorithmic program 606. Algorithmic program 606 generally implements processing logic, for example by software, to combine selected attributes 604 and produce output values 608 that may be used, directly or indirectly, to determine values for algorithm parameters 610. This approach is more flexible and powerful than the table-based or function-based approaches because any logic may be implemented to process and combine selected attributes 604 to produce output values 608. However, this approach may also be slower and more computationally costly.

Figure 7:
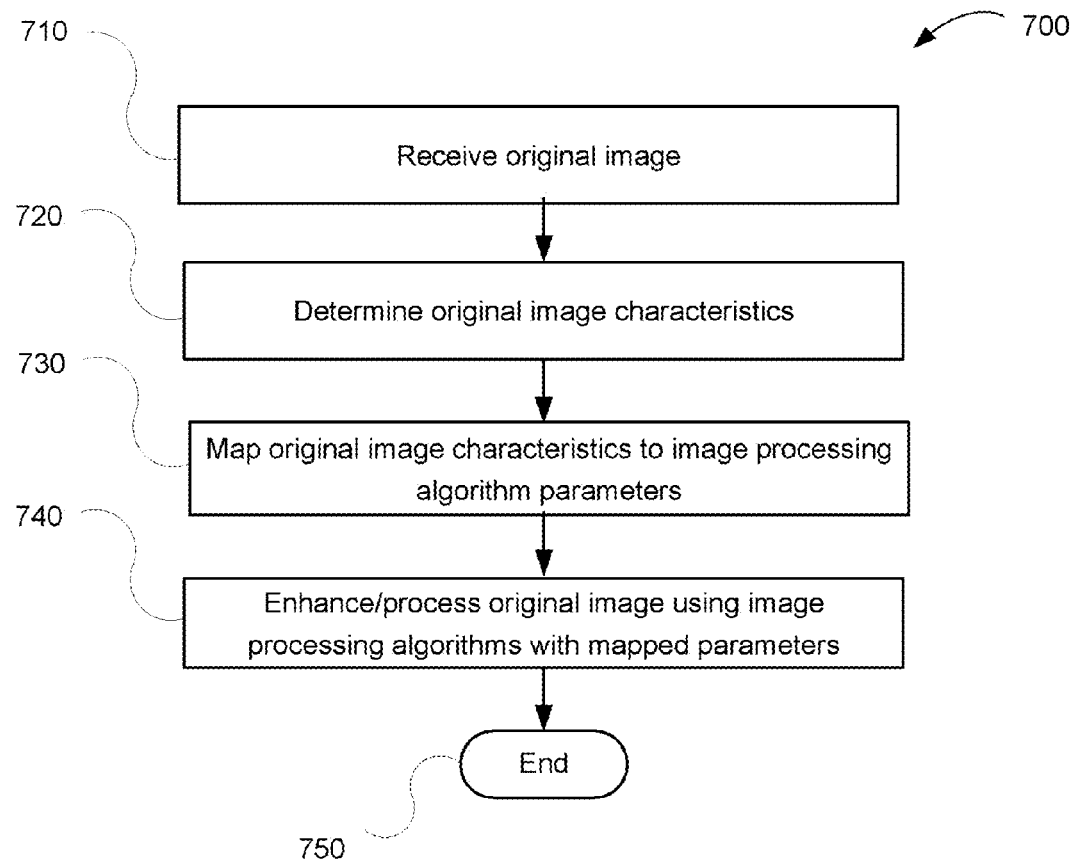
FIG. 7 illustrates a flow diagram of an example method of enhancing an image, in accordance with various embodiments.

FIG. 7 illustrates a flow diagram of an example method of enhancing an image in accordance with various embodiments. The overall automatic parameter setting process 700 is now described with reference to FIG. 7.

Process 700 starts at block 710 where an original image is received. The original image may come from many sources, such as a pre-captured image preloaded in processing equipment, such as a PC, a database, a network-connected server, camera equipment coupled to processing equipment, and the like. The process proceeds to block 720.

At block 720, the original image is used to determine image attributes. Image attributes may be pre-determined and provided for processing, for example, in the form of metadata attached to the original image file or available via a metadata database that is associated with the original image. Alternatively, the original image may be analyzed to determine the image attributes. The process continues to block 730.

At block 730, the determined image attributes are automatically applied, or otherwise used to determine and set algorithm parameters, as described above with respect to FIGS. 3-6. The process continues to block 740.

At block 740, the algorithms have their respective parameters set based on the attributes of the original image and are ready to be applied to the original image to enhance the original image. The algorithms may be used to enhance the original image as described in detail previously with respect to FIGS. 2A and 2B. The process terminates at block 750.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiments discussed herein. Therefore, it is manifestly intended that embodiments be limited only by the claims and the equivalents thereof.

What is claimed is:

1. A method of adjusting a parameter of an image processing algorithm for enhancing an image, the method comprising:
   determining a type of the image, wherein the type of the image corresponds to whether the image is landscape or portrait;
   storing, in a table, a plurality of potential values for the parameter of the image processing algorithm;
   analyzing the image to identify an attribute of the image, wherein the attribute is identified based on the determined type of the image;
   based on the attribute of the image as identified, automatically assigning, to the parameter of the image processing algorithm, a first value of the plurality of potential values for the parameter stored in the table; and
   applying the image processing algorithm to the image, in accordance with the first value assigned to the parameter, to enhance the image, wherein the image is respectively enhanced according to whether the image is landscape or portrait.

2. The method of claim 1, wherein:
   applying the image processing algorithm to the image comprises applying the image processing algorithm to a dark region of the image.

3. The method of claim 1, wherein:
   applying the image processing algorithm to the image comprises applying the image processing algorithm to a bright region of the image.

4. The method of claim 1, wherein analyzing the image to identify an attribute of the image comprises identifying the attribute of the image based on metadata associated with the image.

5. The method of claim 1, wherein the attribute of the image comprises an average pixel intensity.

6. The method of claim 1, wherein the type of the image further corresponds to whether the image is an action shot.

7. The method of claim 1, wherein the attribute of the image comprises a proportion of high and low intensity areas of the image.

8. The method of claim 1, wherein the attribute of the image comprises an amount of detail in a low or high intensity area of the image.

9. The method of claim 8, wherein the amount of detail in the low or high intensity area comprises a distribution of pixel values in the low or high area.

10. The method of claim 1, the attribute of the image processing algorithm comprises at least one of a sampling frequency, a Gaussian filter parameter, a conditional inversion parameter, and an Alpha-blend parameter.

11. The method of claim 1, wherein the table is indexed by the attribute of the image.

12. The method of claim 11, wherein the table includes at least one entry containing a scaling factor for multiplying a base value of the parameter of the image processing algorithm.

13. An apparatus for adjusting a parameter of an algorithm for enhancing an image, the apparatus comprising:
  a processor configured to execute instructions;
  a storage device coupled with the processor, the storage device having instructions stored thereon that when executed cause the apparatus to
    sub-sample or blur the image to produce an image base layer;
    analyze the image to identify an attribute of the image;
    based on the attribute of the image, automatically determine a value of a parameter of an image mapping processing algorithm;
    mapping pixels of the image base layer to pixels of the image;
    computing values for output pixels of an enhanced image based (i) on the image mapping processing algorithm and (ii) the value; and
    generating an enhanced image based on the output pixels.

14. The apparatus of claim 13, wherein the instructions stored on the storage device, when executed, further cause the apparatus to automatically determine the value of the parameter using an indexed table.

15. The apparatus of claim 13, wherein the instructions stored on the storage device, when executed, further cause the apparatus to automatically determine the value of the parameter using at least one function.

16. The apparatus of claim 13, wherein the instructions stored on the storage device, when executed, further cause the apparatus to automatically determine the value of the parameter using an algorithmic program.

17. The apparatus of claim 13, wherein the parameter comprises at least one of a sampling frequency, a Gaussian filter parameter, a conditional inversion parameter, and an Alpha-blend parameter.

18. The apparatus of claim 13, wherein the attribute of the image comprises at least one of an average pixel intensity, a pixel intensity range, a proportion of high and low intensity areas of the image, and an amount of detail in a low or high intensity area of the image.

19. The apparatus of claim 13, wherein the instructions stored on the storage device, when executed, further cause the apparatus to apply the image processing algorithm to a dark region of the image for shadow enhancement.

20. The apparatus of claim 13, wherein the instructions stored on the storage device, when executed, further cause the apparatus to apply the image processing algorithm to a bright region of the image for highlight enhancement.

* * * * *